(12) United States Patent
Dismon et al.

(10) Patent No.: US 6,443,135 B1
(45) Date of Patent: Sep. 3, 2002

(54) ASSEMBLY OF A VALVE UNIT, A COMBUSTION AIR INTAKE AND AN EXHAUST GAS RECIRCULATION UNIT FOR AN INTERNAL COMBUSTION ENGINE

(75) Inventors: Heinrich Dismon, Gangelt; Andreas Köster, Essen, both of (DE)

(73) Assignee: Pierburg Aktiengesellschaft, Neuss (DE)

( * ) Notice: Subject to any disclaimer, the term of this patent is extended or adjusted under 35 U.S.C. 154(b) by 0 days.

(21) Appl. No.: 09/680,164

(22) Filed: Oct. 5, 2000

Related U.S. Application Data
(60) Provisional application No. 60/223,046, filed on Aug. 4, 2000.

(30) Foreign Application Priority Data

Oct. 5, 1999 (DE) .......................................... 199 47 971
Jan. 21, 2000 (DE) .......................................... 100 02 577

(51) Int. Cl.[7] ................................................ F02B 47/08
(52) U.S. Cl. ........................ 123/568.18; 123/568.21; 123/568.23; 251/129.11
(58) Field of Search ........................ 123/568.21, 568.23, 123/568.24, 568.17, 568.18; 251/129.11, 129.12, 129.13

(56) References Cited

U.S. PATENT DOCUMENTS

| 4,473,056 A | * | 9/1984 | Ishida et al. | ........... 123/568.23 |
| 4,690,119 A | * | 9/1987 | Makino et al. | ........ 123/568.23 |
| 4,840,350 A | | 6/1989 | Cook | .................... 251/129.11 |
| 5,263,680 A | * | 11/1993 | Laux | ..................... 251/129.11 |
| 5,494,255 A | | 2/1996 | Pearson et al. | ........ 251/129.15 |
| 5,704,585 A | | 1/1998 | Hrytzak et al. | ........ 251/129.01 |
| 5,937,835 A | * | 8/1999 | Turner et al. | ........... 123/568.24 |
| 6,039,034 A | * | 3/2000 | Field et al. | ............. 123/568.23 |
| 6,044,827 A | * | 4/2000 | Pfaff et al. | ............. 123/568.18 |
| 6,056,262 A | * | 5/2000 | Mazur | ..................... 251/129.1 |
| 6,102,016 A | * | 8/2000 | Sitar et al. | ............. 123/568.23 |

FOREIGN PATENT DOCUMENTS

| DE | 3606722 | 9/1987 |
| DE | 4338192 | 11/1995 |
| DE | 19725668 | 10/1998 |
| EP | 0900930 | 3/1999 |

* cited by examiner

*Primary Examiner*—Willis R. Wolfe
(74) *Attorney, Agent, or Firm*—Ladas & Parry

(57) ABSTRACT

A valve unit for internal combustion engines with a drive unit, a gear mechanism, a valve rod and a valve disk, the gear mehanicm being provided with an eccentrically disposed coupling part which is connected coactingly with the valve rod, the coupling part being a bearing element which serves as a connection means with the valve rod. A combustion-air intake-channel portion and an exhaust-gas return unit are integrally combined with the valve unit.

21 Claims, 4 Drawing Sheets

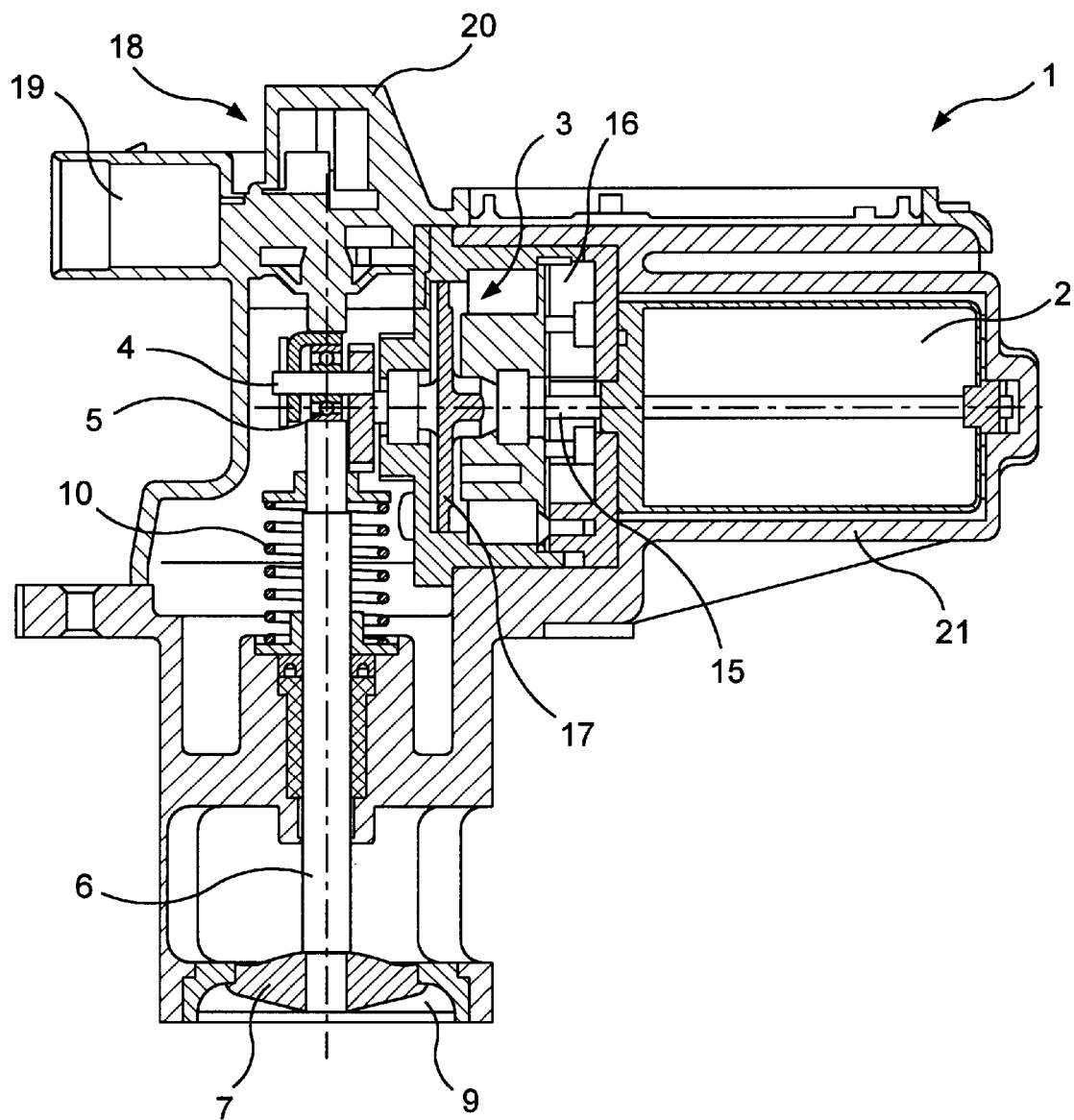
F I G. 2

ASSEMBLY OF A VALVE UNIT, A COMBUSTION AIR INTAKE AND AN EXHAUST GAS RECIRCULATION UNIT FOR AN INTERNAL COMBUSTION ENGINE

This application claims the benefit of U.S. provisional application No. 60/223,046, filed Aug. 4, 2000.

FIELD OF THE INVENTION

The invention related to an assembly of a valve unit, a combustion air intake and an exhaust gas recirculation unit for an internal combustion engine.

BACKGROUND AND PRIOR ART

A valve unit for use in an exhaust-gas return unit is known, for example, from European Patent A2 900930. The valve unit therein is provided with a drive unit, a gear mechanism, a valve rod and at least one valve disk, the gear mechanism being provided with an eccentrically disposed coupling which is connected coactingly with the valve rod. Rotary movements of the motor and of the gear mechanism connected thereto can be transformed in simple manner to linear movements of the valve rod with large positioning force by such an eccentric arrangement of the coupling. Because the valve rod is fixed on the coupling in this case, however, relatively large friction forces must be overcome, thus making it difficult, because of the slewing movement of the valve rod, to achieve positioning of the valve element.

SUMMARY OF THE INVENTION

An object of the invention is to provide a valve unit of the above type for internal combustion engines, which avoids the aforesaid disadvantages and in addition can be manufactured inexpensively with simple construction.

This object is achieved in that the coupling comprises a bearing element which serves as a connection means with the valve rod.

In this way, it is ensured that straight, linear movement of the valve rod takes place despite the eccentricity of the coupling. Moreover, frictional losses are limited to a minimum. A particularly simple and robust embodiment of the valve unit can be achieved by constructing the bearing element as a roller bearing. The gear mechanism can then be provided with a guide member which has cam elements acting on the roller bearing, one in the vertical direction and the other in the horizontal direction, the guide member being fixed to the valve rod, whereby the valve rod and thus also the valve disk attached thereto, by virtue of the horizontal cam element, can also be moved in closing direction in response to reversal of the direction of rotation of the drive unit. In this respect, the vertical cam element functions as an end stop for the roller bearing if it were to exceed the maximum stroke (or angle of rotation). In this way, it is possible to achieve motor-assisted closing and retaining forces, which can prevent unwanted opening of the valve when it is used, for example, as an exhaust-gas return valve. Moreover, critical operating conditions such as seizing or sticking of the valve disk can be overcome. For automatic restoration of the valve disk to closed position, a spring element is provided which applies tension on the valve rod in the direction of the roller bearing.

A gear mehanicm comprising a planetary gear mechanism or planetary stationary gear mechanism is particularly advantageous for compact construction of the valve unit. In particular, the planetary stationary gear mechanism allows a short overall length of the gear mehanicm, with the accompanying result that reduced inertia as well as low friction result in higher efficiency of the gear mehanicm.

A valve unit which is simple to assembly is obtained in that there is provided a cover element, which is equipped with a connection plug for establishing electrical contact and which has plug contact elements which engage complementary plug contact elements of the drive unit when the cover element is mounted in place, thus establishing an electrical connection to the drive unit. In a particularly advantageous embodiment, there is provided a sensor for sensing the position of the valve stroke, the sensor being designed such that it can be electrically connected to the connection plug. The sensor can be comprised of a diametral annular magnet and a Hall-effect sensor element. Thus, a ring gear of the planetary or planetary stationary gear mechanism can be disposed in the annular magnet. There can also be provided an on-board electronic module for system control.

From the viewpoint of assembly, it is particularly advantageous to dispose the drive unit and the gear mechanism unit in a tunnel housing.

The valve unit of the invention is suitable in particular for use in the exhaust-gas return line of an internal combustion engine. In a valve unit for exhaust-gas return as disclosed, for example, in German Patent A1 4338192, the valve rod projects directly into the air intake tube, and extreme fouling can occur because of the contact of the cold fresh air with the hot exhaust gas. This disadvantage is avoided in a combustion-air intake-channel portion in which the exhaust-gas inlet portion is provided with a discharge portion, which is disposed coaxially relative to the intake-channel portion and which, via a connecting channel disposed transversely relative to the discharge portion, is connected to a valve-channel portion, which is intersected by the connecting channel, the connecting channel being provided with an outwardly projecting channel attachment, which is closed by a plug type insert. This valve-channel portion can form a connecting nozzle for an exhaust-gas return line, and this connecting nozzle can also be provided with the valve seat.

Also provided in accordance with the invention, is an exhaust-gas return unit with a valve unit and a combustion-air channel portion, in which the valve rod extends into a valve guide bushing, which at one end projects into the valve-channel portion and at the other end into a valve spring chamber. In this case it is advantageous for the valve rod, on the portion which projects into the valve spring chamber, to support the guide member, which bears on one end of the spring element whose other end is braced against the wall of the valve-spring chamber. The valve-spring chamber can be closed off from the outside by the housing for the gear mechanism and drive unit. The valve guide bushing can be provided with a dirt chamber, which is formed, for example, by a bore in the housing. In order to achieve an advantageous exhaust gas return, the valve disk can be provided with a cylindrical portion extending downstream from the valve seat. In order to be able to use a smaller valve disk, which in turn permits smaller positioning forces, the valve disk can be provided with a tapered edge, which cooperates with a taper portion of the valve seat and located downstream from the line of contact to form a diffusor portion. A throttle valve can be disposed in the intake-channel portion, upstream from the discharge portion. To achieve a construction which saves as much space as possible, the combustion-air intake-channel portion can be integrated with the housing of the gear mechanism and drive unit.

BRIEF DESCRIPTION OF THE DRAWINGS

FIG. 2 is a longitudinal sectional view of the valve unit.

DETAILED DESCRIPTION

Figure 1:
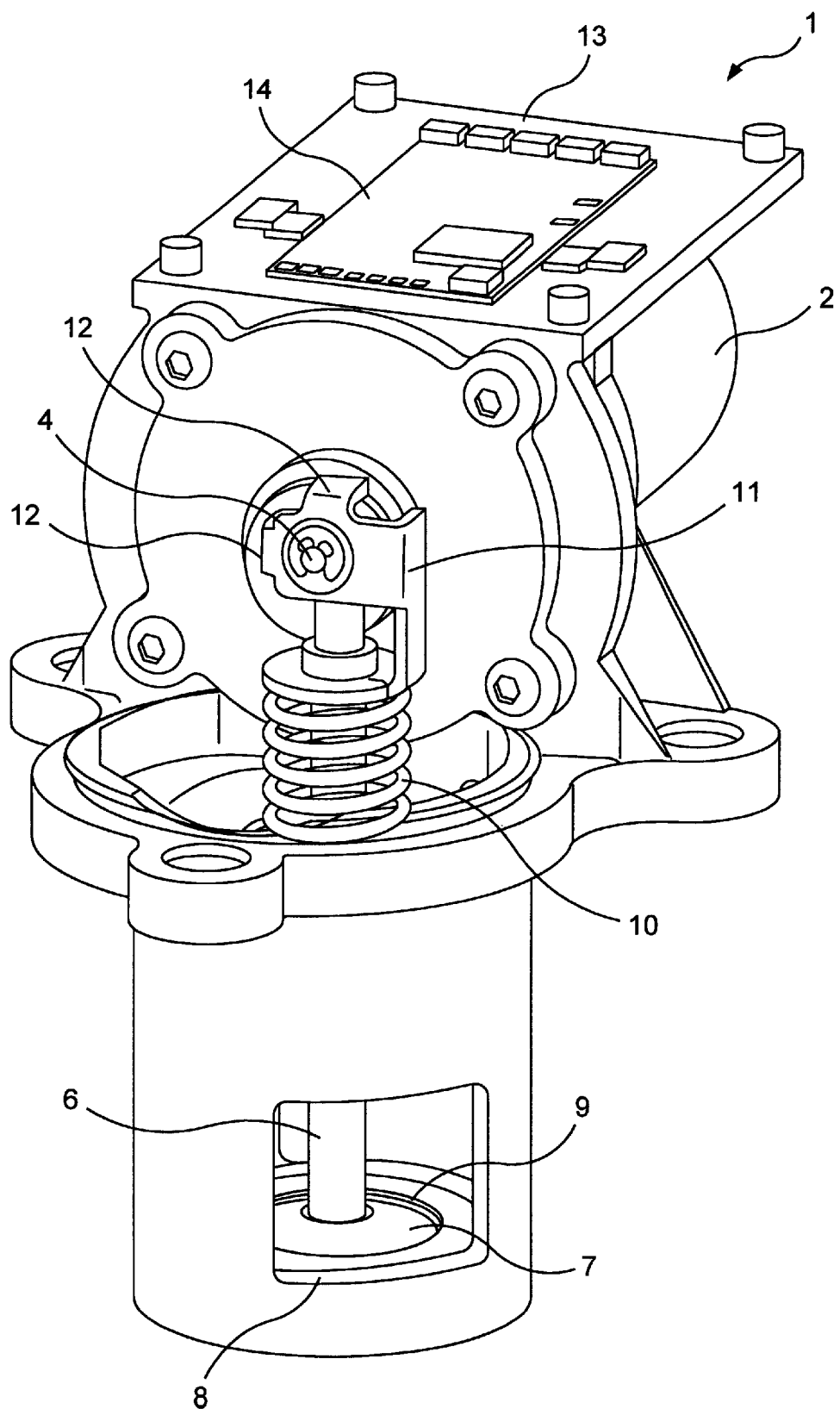
FIG. 1 is a perspective view of a valve unit according to the invention in which a cover has been removed.

FIG. 1 shows a valve unit 1 provided with a drive motor 2 and a gear mechanism 3, (illustrated in detail in FIG. 2) and with a bearing 5 disposed eccentrically on a journal 4 as a coupling, which is connected coactingly with a valve rod 6, for moving a valve disk 7 to an open position. Valve unit 1 is further provided with an outlet port 8 and an inlet port 9 constructed as the valve seat.

For return of the valve disk to its closed position when the drive motor 2 is deactivated, a spring element 10, engages a guide member 11 fixed securely on valve rod 6 to urge valve rod 6 in the direction of bearing 5. The guide member 11 ensures that valve rod 6 can also be moved in the closing direction in response to reversal of the direction of rotation of the drive unit. In this way, valve disk 7 can be freed from a jammed or stuck position. For this purpose, guide member 11 is provided with cam elements 12 acting on the bearing, one in vertical direction and the other in horizontal direction. A housing plate 13 is disposed above drive unit 2, for mounting an operational on-board electronic module thereon.

FIG. 2 shows in greater detail gear mechanism 3 with bearing 5 disposed eccentrically above a bearing journal 4. Gear mechanism 3 is in the form of a planetary stationary gear mechanism, in which there are driven, by an input shaft 15, which is connected to drive motor 2, three non-revolving planetary gears 16, which in turn drive a ring gear 17, on the side of which remote from drive motor 2 there is disposed bearing journal 4 with bearing 5.

A particular compact construction is achieved when ring gear 17 carries a co-rotating diametral annular magnet, which cooperates in known manner with a Hall-effect sensor, so that the valve stroke can be determined in simple manner from the rotary movement of the ring gear.

Further illustrated is a cover 18, which, as an alternative to the aforesaid Hall-effect sensor, can be provided with a sensor 19, which in known manner senses the linear position of the valve stroke. Also provided is a connection plug 20, to establish electrical contact between sensor 19 and motor 2. The connecting plug 20 includes plug contact elements which are connected with drive motor 2, so that electrical control of valve unit 1 is obtained.

For simplicity of assembly, a housing 21 of valve unit 1 is constructed in the region of drive motor 2 as a tunnel housing.

Figure 3:
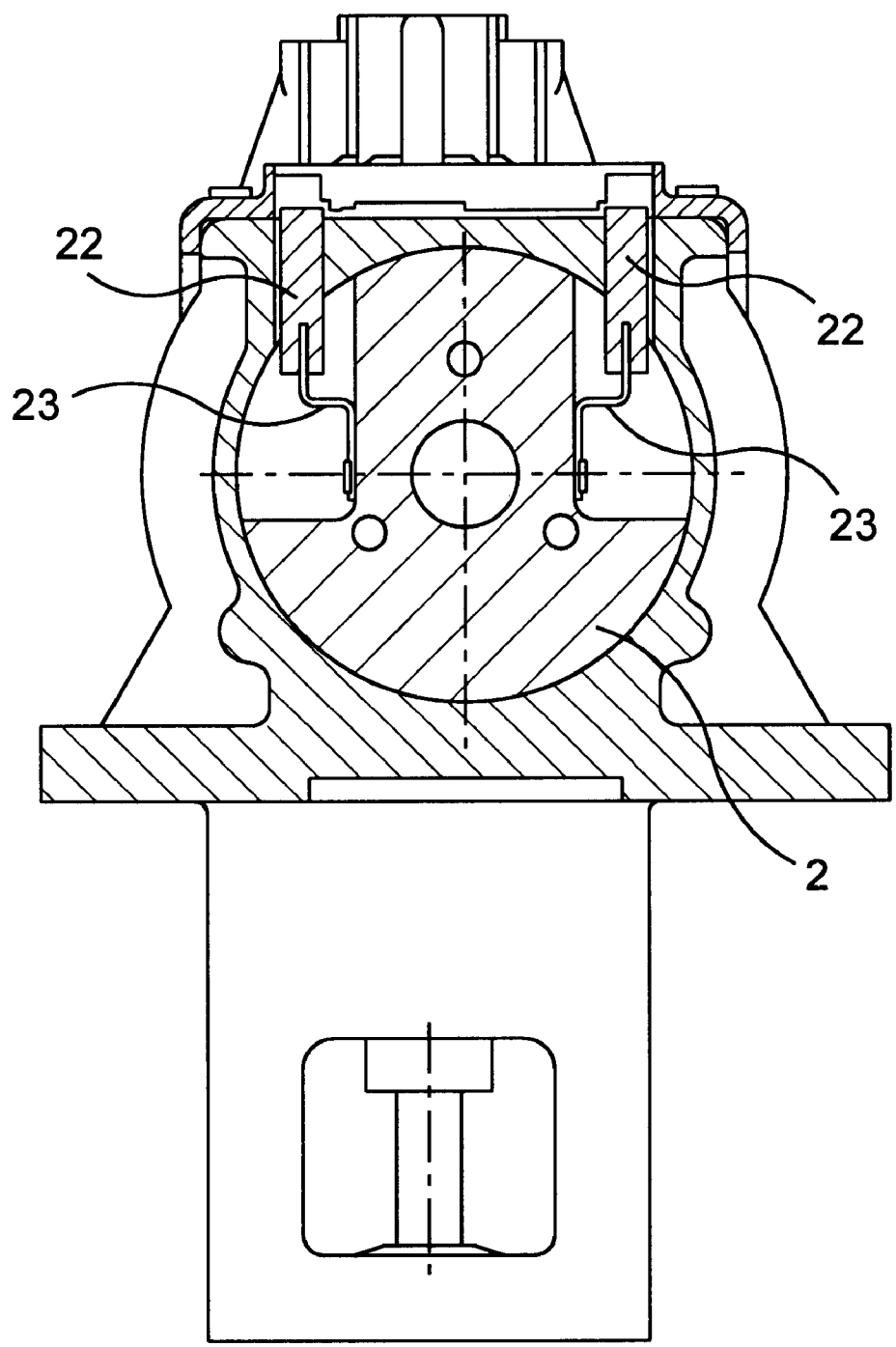
FIG. 3 is a transverse sectional view through a drive unit of the valve unit, the cover being in place.

FIG. 3 shows a sectional view of drive unit 2 with cover 18 in place. As already discussed hereinabove, cover 18 is provided with plug contact elements 22, which cooperate with cover contact elements 23 of drive motor 2. In this way, electrical contact can be established in simple manner by the mounting of cover 18.

Figure 4:
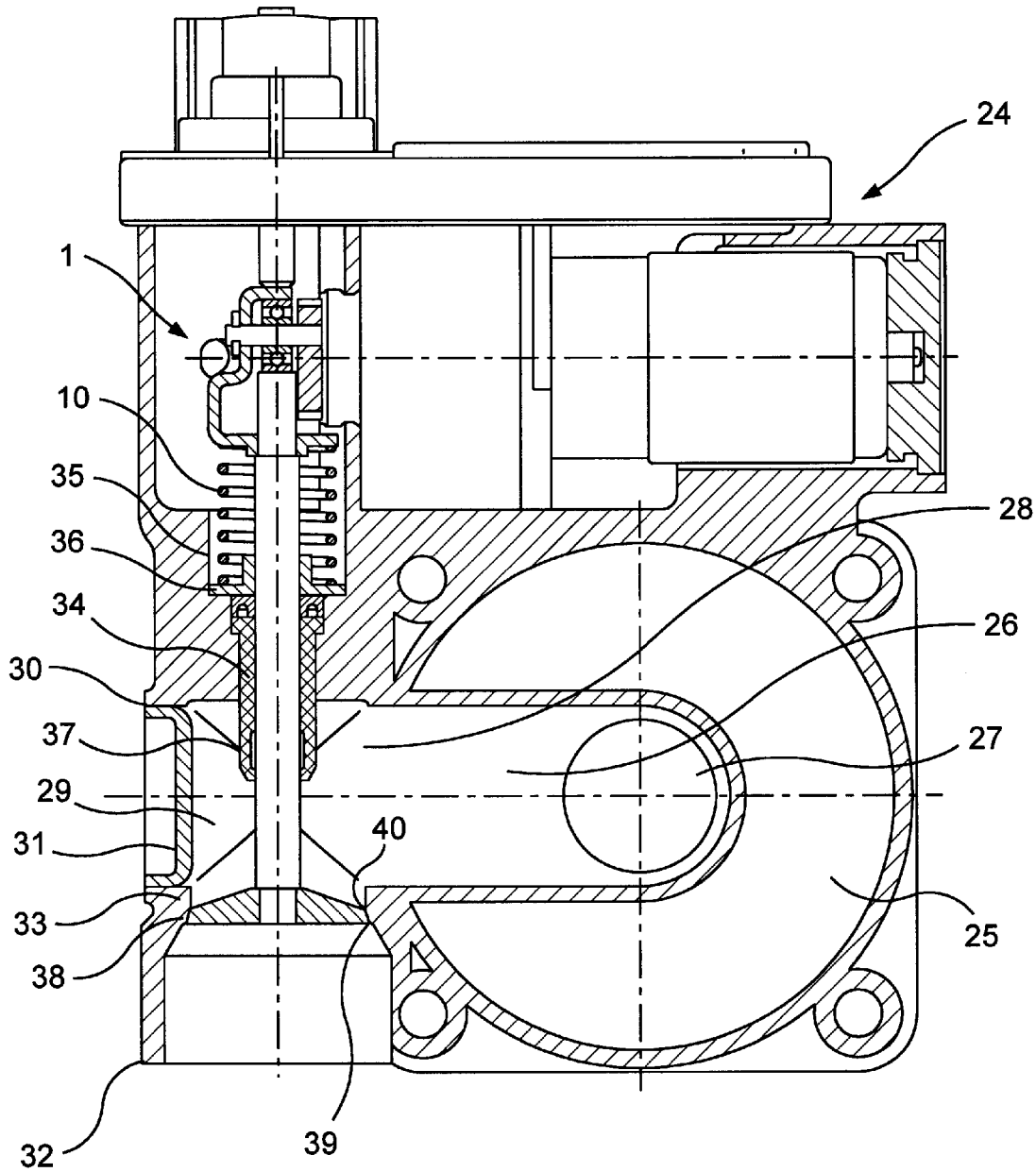
FIG. 4 is a longitudinal sectional view showing an exhaust-gas return unit integrated with the valve unit.

FIG. 4 shows a sectional view including an exhaust-gas return unit 24 according to the invention. The exhaust-gas return unit is integrated with valve unit 1 and is provided with a combustion-air intake-channel 25 and with an exhaust-gas inlet portion 26.

According to the invention, the exhaust-gas inlet 26 is equipped with a discharge portion 27, which is disposed coaxially relative to combustion-air intake-channel 25 and which is connected via a connecting channel 28, disposed transversely relative to discharge portion 27, to a channel 29 in valve 1. Connecting channel 28 is provided with an outwardly projecting channel attachment 30, which is closed by a plug insert 31. This construction provides a space-saving arrangement as well as manufacture in one piece.

It is advantageous if the valve-channel portion 29 forms a connecting nozzle 32 for an exhaust-gas return line (not illustrated), the connecting nozzle 32 being provided with a valve seat 33, which cooperates with valve disk 7 fastened to valve rod 6 and disposed coaxially relative to valve-channel portion 29.

It is further provided that valve rod 6 is guided in a valve guide bushing 34, which projects at one end into valve-channel portion 29 and at the other end into a valve spring chamber 35, valve rod 6 being provided on the portion which projects into valve spring chamber 35 with guide member 11, on which engages spring element 10, whose other end is braced against wall 36 of the valve spring chamber 35.

In a particular space-saving construction, valve spring chamber 35 is sealed off from the outside by housing 21 which simultaneously forms the housing of the gear mechanism and drive unit. The valve spring chamber 35 can be connected to the atmosphere by a vent hole (not illustrated).

Advantageously the valve guide bushing 36 is equipped with a dirt chamber 37. Because valve disk 7 can be provided with a cylindrical portion (not shown) downstream from valve seat 33, an advantageous characteristic of exhaust gas flow in the exhaust gas return line can be achieved and, because valve disk 7 is provided with a taper edge 38, which cooperates with a taper portion 39 of valve seat 33 to form a diffusor portion 40, a smaller size valve-disk can be employed, which needs smaller size positioning forces, since delivery pressure recovery is achieved in the diffusor.

Although the invention is disclosed with reference to particular embodiments thereof, it will become apparent to those skilled in the art that numerous modifications and variations can be made which will fall within the scope and spirit of the invention as defined by the attached claims.

What is claimed is:

1. A valve unit for an internal combustion engine comprising a drive unit, a gear mechanism connected to the drive unit, a valve rod connected to the gear mechanism, a valve disk on the valve rod, said gear mechanism including an eccentrically disposed coupling which is connected coactingly with the valve rod, said coupling comprising a bearing element which serves as a connection means with the valve rod, wherein the gear mechanicm comprises a planetary gear mechanism.

2. A valve unit for an internal combustion engine comprising a drive unit, a gear mechanism connected to the drive unit, a valve including a valve rod connected to the gear mechanism and a valve disk on the valve rod, said gear mechanism including a coupling eccentrically disposed with respect to said drive unit and connected coactingly with the valve rod, said coupling comprising a roller bearing which serves as a connection means with the valve rod to raise and lower the valve rod as the drive unit is selectively actuated to close and open the valve.

3. A valve unit according to claim 2, wherein the gear mechanicm is provided with a guide member which includes cam elements acting on the roller bearing, one cam element acting in a vertical direction and the other cam element acting in a horizontal direction, said guide member being fixed to the valve rod.

4. A valve unit according to claim 2, comprising a spring applying tension to the valve rod in the direction of the roller bearing.

5. A valve unit according to claim 2, comprising an on-board electronic module for system control.

6. A valve unit according to claim 2, wherein the drive unit and the gear mechanism are disposed in a tunnel housing.

7. A valve unit for an internal combustion engine comprising a drive unit, a gear mechanism connected to the drive unit, a valve rod connected to the gear mechanism, a valve disk on the valve rod, said gear mechanism including an eccentrically disposed coupling which is connected coactingly with the valve rod, said coupling comprising a bearing element which serves as a connection means with the valve rod, a cover element including a connection plug for establishing electrical contact and which has plug contact elements which engage complementary plug contact elements on the drive unit when the cover element is mounted in place, thus establishing an electrical connection to the drive unit.

8. A valve unit according to claim 7, comprising a sensor for sensing position of a valve stroke, said sensor being electrically connected to the connection plug.

9. A valve unit according to claim 8, wherein the sensor unit comprises a diametral annular magnet and a Hall-effect sensor element cooperating with the magnet.

10. A valve unit according to claim 9, wherein a ring gear of the planetary gear mechanism is disposed in the annular magnet.

11. A combustion-air intake-channel portion for an internal combustion engine, with an exhaust-gas inlet portion, wherein the exhaust-gas inlet portion comprises a discharge portion, which is disposed coaxially relative to the intake-channel portion and which, via a connecting channel disposed transversely relative to the discharge portion, is connected to a valve-channel portion which is intersected by the connecting channel, said connecting channel extending outwardly with respect to said intake-channel portion and being provided with an outwardly projecting channel attachment, which is closed by a plug insert.

12. A combustion-air intake-channel portion according to claim 11, wherein the valve-channel portion forms a connecting nozzle for an exhaust-gas return line.

13. A combustion-air intake-channel portion according to claim 12, wherein the connecting nozzle is provided with a valve seat for a valve in the valve-channel.

14. An exhaust-gas return unit according to claim 13, in combination with a valve unit comprising a drive unit, a gear mechanism connected to the drive unit, a valve rod connected to the gear mechanism, a valve disk on the valve rod, said gear mechanism including an eccentrically disposed coupling which is connected coactingly with the valve rod, said coupling comprising a bearing element which serves as a connection means with the valve rod, wherein said valve rod extends into a valve guide bushing, which at one end projects into the valve-channel portion and at the other end into a valve spring chamber.

15. An exhaust-gas return unit according to claim 14, wherein the combustion-air intake-channel portion is integral with the housing of the gear mechanism and drive unit.

16. An exhaust-gas return unit according to claim 14, wherein the valve rod on the portion which projects into the valve spring chamber, supports the guide member which bears on the spring whose other end is braced against a wall of the valve-spring chamber.

17. An exhaust-gas return unit according to claim 16, wherein the valve-spring chamber is closed off from the outside by the housing for the gear mechanism and drive unit.

18. An exhaust-gas return unit according to claim 17, wherein the valve guide bushing is provided with a dirt chamber.

19. An exhaust-gas return unit according to claim 18, wherein the valve disk is provided with an integral cylindrical portion extending downstream from the valve seat.

20. An exhaust-gas return unit according to claim 19, wherein the valve disk is provided with a taper edge, which cooperates with a taper portion of the valve seat and disposed downstream from a line of contact of the valve disk and the seat to form a diffusor portion.

21. An exhaust-gas return unit according claim 20, comprising a throttle valve disposed in the combustion-air intake-channel portion upstream from the discharge portion.

\* \* \* \* \*